(12) United States Patent
Sandoval, Jr. et al.

(10) Patent No.: US 9,187,140 B2
(45) Date of Patent: Nov. 17, 2015

(54) IDLER WHEEL ASSEMBLY

(71) Applicant: Harnischfeger Technologies, Inc., Wilmington (DE)

(72) Inventors: Peter Sandoval, Jr., New Berlin, WI (US); Andrew Wagner, Sussex, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 401 days.

(21) Appl. No.: 13/660,339

(22) Filed: Oct. 25, 2012

(65) Prior Publication Data
US 2013/0102427 A1    Apr. 25, 2013

Related U.S. Application Data

(60) Provisional application No. 61/551,343, filed on Oct. 25, 2011.

(51) Int. Cl.
*B62D 55/15*     (2006.01)
*B62D 55/14*     (2006.01)
*F16C 17/10*     (2006.01)

(52) U.S. Cl.
CPC .............. *B62D 55/15* (2013.01); *F16C 17/107* (2013.01); *F16C 2300/14* (2013.01)

(58) Field of Classification Search
CPC ......... B62D 55/15; F16C 13/02; F16C 17/10; F16C 2326/20; F16C 33/74
USPC ......................................................... 474/198
See application file for complete search history.

(56) References Cited

U.S. PATENT DOCUMENTS

| 2,228,770 A | 1/1941 | Le Tourneau |
| 3,744,860 A | 7/1973 | Casey |
| 3,843,214 A | 10/1974 | Piepho |

(Continued)

FOREIGN PATENT DOCUMENTS

| DE | 3418993 | 11/1985 |
| JP | 2005255043 | 9/2005 |

OTHER PUBLICATIONS

Wayback Engine, "Fenner Taper Lock Bushes" (retrieved on Sep. 16, 2013) Retrieved from internet <URL: http://web.archive.org/web/20090728053​5/http://www.fptgroup.com/fenner.asp?title=Taper-Lock-Bushes&pageid=2668> published on Jul. 28, 2009.

(Continued)

*Primary Examiner* — William E Dondero
*Assistant Examiner* — Robert T Reese
(74) *Attorney, Agent, or Firm* — Michael Best & Friedrich LLP (57) ABSTRACT

A crawler assembly including a crawler frame member having a first crawler extension and a second crawler extension and an idler wheel disposed therebetween. The idler wheel defines a bore therethrough. The crawler assembly includes a shaft that extends through the bore. The shaft is fixed relative to the wheel by a tapered interference fit and rotatable relative to the first and second crawler extensions. A first side of the shaft is received by the first extension and has at least one journal bushing disposed therebetween. A second side of the shaft is received by the second extension and has a least one journal bushing disposed. A removable endcap is secured to each of the first and second sides of the shaft. A thrust surface is created at an interface between the endcaps and the journal bushings.

18 Claims, 8 Drawing Sheets

(56) References Cited

U.S. PATENT DOCUMENTS

| | | | |
|---|---|---|---|
| 3,847,495 A | 11/1974 | Peter et al. | |
| 3,849,015 A | 11/1974 | Peter et al. | |
| 3,972,635 A | 8/1976 | Peter et al. | |
| 3,990,804 A | 11/1976 | Peter et al. | |
| 4,083,610 A | 4/1978 | Kruchowski | |
| 4,095,908 A | 6/1978 | Schafer et al. | |
| 4,471,846 A | 9/1984 | Mullenberg | |
| 4,475,842 A | 10/1984 | Onaya et al. | |
| 4,702,637 A | 10/1987 | Muellenberg | |
| 4,716,644 A * | 1/1988 | Crotti | 29/525 |
| 4,917,530 A | 4/1990 | Engelhardt et al. | |
| 5,188,478 A | 2/1993 | Bitsch et al. | |
| 5,370,472 A | 12/1994 | Muellenberg | |
| 5,439,295 A | 8/1995 | Mikolaizik | |
| 5,558,457 A | 9/1996 | Mullenberg | |
| 5,865,561 A | 2/1999 | Muellenberg | |
| 5,993,102 A | 11/1999 | Miyako | |
| 6,099,199 A | 8/2000 | Mullenberg | |
| 6,583,528 B2 | 6/2003 | Gabrys | |
| 7,309,187 B2 | 12/2007 | Swanson | |
| 7,963,014 B2 | 6/2011 | Bradberry et al. | |
| 2011/0182660 A1 | 7/2011 | Kemmler et al. | |
| 2011/0284346 A1 * | 11/2011 | Dunn | 198/835 |

OTHER PUBLICATIONS

Wayback Engine, "MasterDrive QD Bushings" (retrieved on Sep. 16, 2013) Retrieved from Internet <URL: http://web.archive.org/web/20060317102343/http:www.masterdrives.com/masterbookPDFs/qdbushingpages.pdf> published on Mar. 17, 2006.

First Examination Report from the Australian Government Intellectual Property Office for Application No. 2012244206 dated Oct. 11, 2013 (6 pages).

* cited by examiner

IDLER WHEEL ASSEMBLY

CROSS-REFERENCE TO RELATED APPLICATION

This application claims priority to U.S. Provisional Patent Application No. 61/551,343, filed Oct. 25, 2011, the entire contents of which is incorporated by reference herein.

BACKGROUND

The present invention relates to a mining shovel, and in particular to an idler wheel assembly.

Front idler wheel assemblies are used in conjunction with machines, such as, among other applications, mining shovels, which utilize a straddle mount axle shaft support where the axle shaft is intended to rotate with the idler wheel. The current front idler wheel and idler axle shaft configuration utilizes a splined joint between the shaft and the wheel. The spline connection provides a torsional constraint between the two; however, the spline connection does not constrain the wheel from sliding axially from side to side across the splines. Side to side motion across the splines results in high wear between the components of the front idler wheel assembly. Furthermore, splined components found in the current idler wheel configurations are expensive to manufacture.

SUMMARY

In one embodiment, the invention provides a crawler assembly including a crawler frame member having an idler wall disposed between a first crawler extension and a second crawler extension. The idler wheel defines a bore therethrough. The crawler assembly additionally includes a shaft extending through the bore. The shaft is fixed relative to the wheel by a tapered interference fit and rotatable relative to the first and second crawler extensions. A first side of the shaft is received by the first extension and has at least one journal bushing disposed therebetween. Similarly, a second side of the shaft is received by the second extension and has least one journal bushing disposed therebetween. A removable endcap is secured to each of the first and second sides of the shaft such that a thrust surface is created at an interface between the endcaps and the journal bushings.

In another embodiment the invention provides a method of an idler wheel assembly including an idler wheel for attachment between a first extension and a second extension of a crawler frame. The wheel includes a bore that receives a shaft extending therethrough. A taper lock bushing is disposed between the shaft and the wheel such that the taper lock bushing creates an interference fit between shaft and the wheel. A first side of the shaft is received by the first extension and has at least one bushing disposed therebetween. Similarly, a second side of the shaft is received by the second extension and has a least one bushing disposed therebetween. A removable endcap is secured to each of the first and second sides of the shaft such that a thrust surface is created at an interface between the endcaps and the journal bushings.

In another embodiment the invention provides an idler wheel assembly including an idler wheel for attachment between a first extension and a second extension of a crawler frame. The wheel includes a bore and is coupled to a wheel hub having a tapered inner diameter. A shaft extends through the bore of the wheel and the hub. A portion of the shaft includes a tapered outer diameter that is complimentary to the tapered inner diameter, whereby the interference fit is created therebetween to fix the shaft relative to the wheel. A first side of the shaft is received by the first extension and has at least one journal bushing disposed therebetween. A second side of the shaft is received by the second extension and has a least one journal bushing disposed therebetween. A removable endcap is secured to each of the first and second sides of the shaft such that a thrust surface is created at an interface between the endcaps and the journal bushings.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
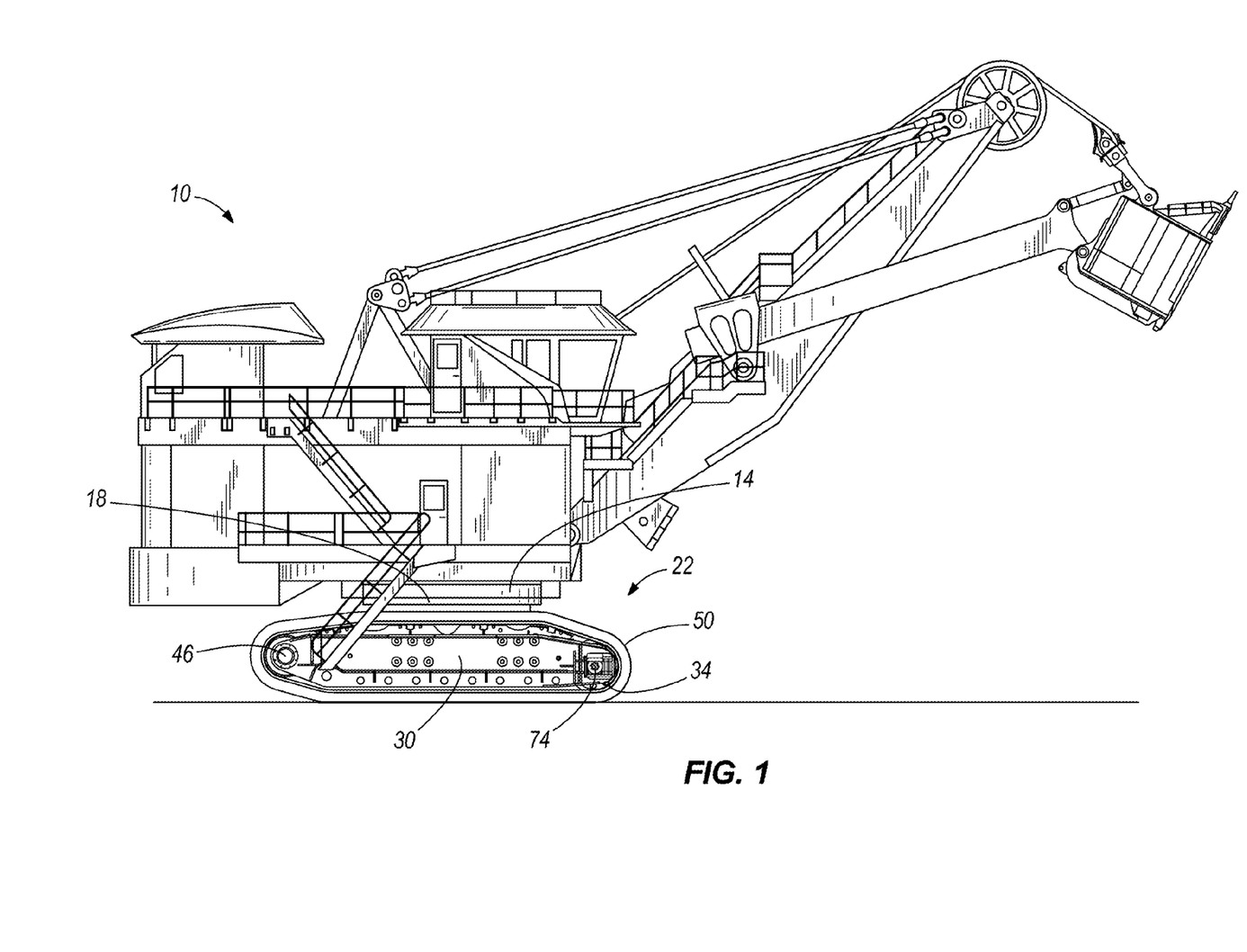
FIG. 1 is perspective view of a mining shovel.
Figure 2:
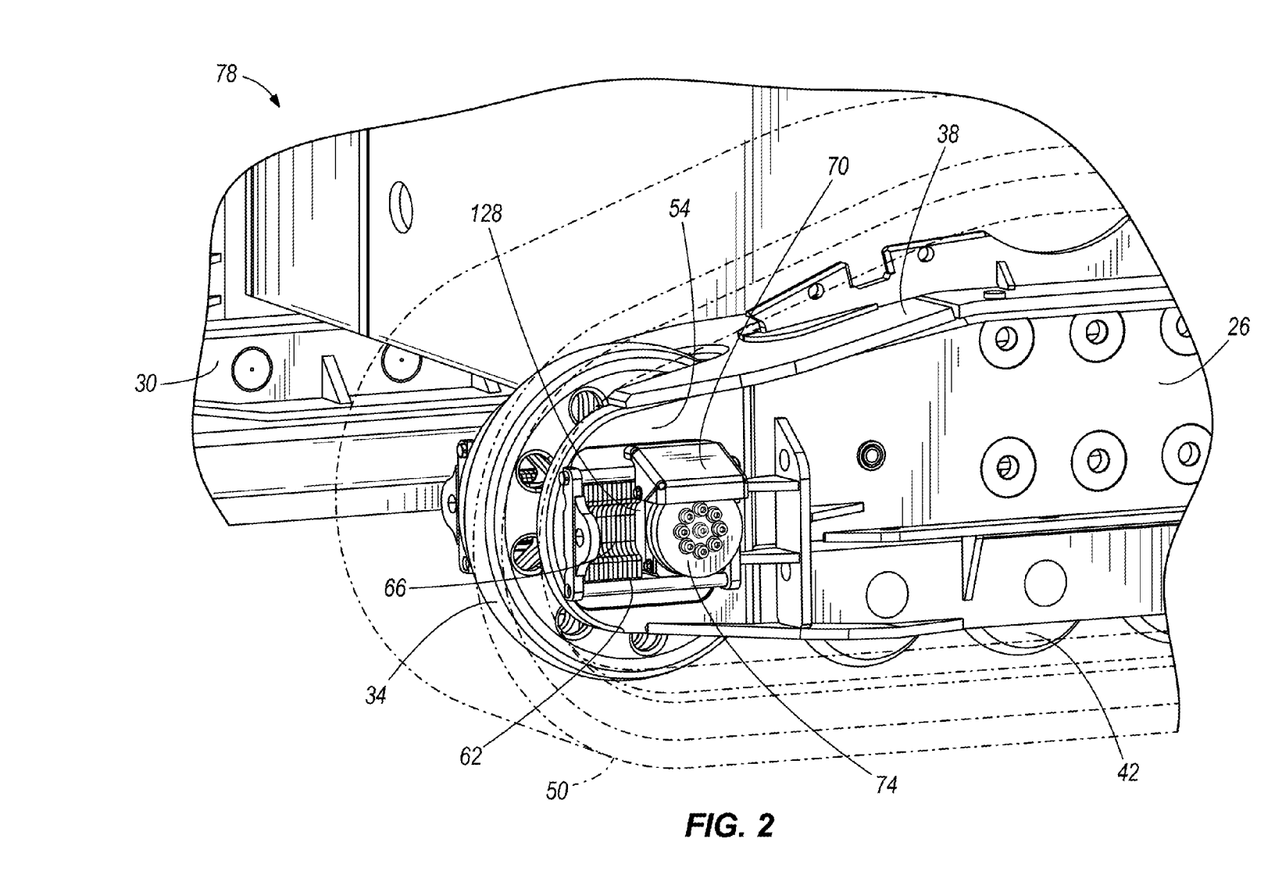
FIG. 2 is perspective view of a front idler wheel assembly and a crawler frame of the mining shovel.
Figure 3:
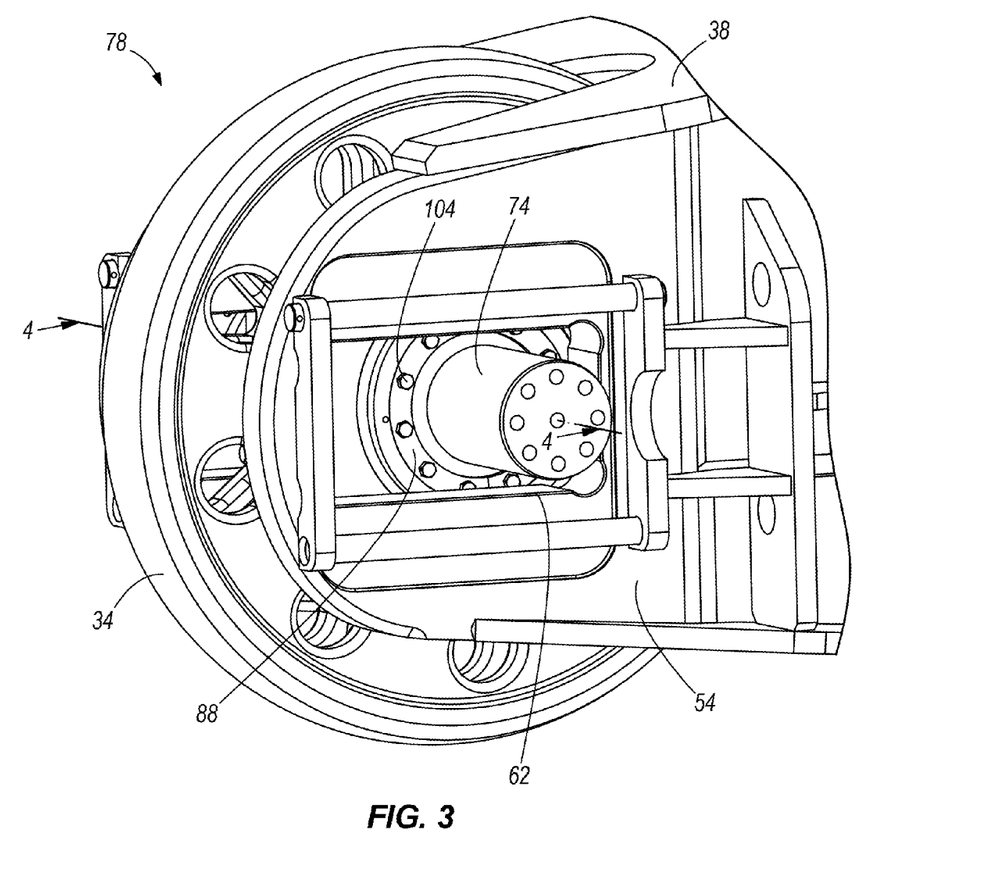
FIG. 3 is a perspective view of a front idler wheel assembly according to one embodiment of the invention.

FIGS. 1 and 2 illustrate a mining shovel 10 including a main platform 14, a lower frame 18, and a crawler assembly 22. The crawler assembly 22 includes, in part, a first crawler frame member 26 and a second crawler frame member 30, and constitutes a framework that supports motion of the mining shovel 10. The first and second crawler frame members 26, 30 each support a crawler track 50 on either side of the mining shovel 10. Each of the crawler frame members 26, 30 includes a first extension 54 and a second extension 58, each with a rectangular opening 62 having a shim plate 66 and a shaft guard 70 positioned therein. The crawler frame members 26, 30 each define a top of the crawler frame 38 and include a front idler wheel assembly 78, carrier wheels 42, and a rear driven crawler wheel 46. Each front idler wheel assembly 78 includes a front idler wheel 34, or a gear in some embodiments, positioned between the two extensions 54, 58 of the respective frame member 26, 30 and coupled to an idler axle 74 shaft for rotation therewith. The axle shaft 74 extends through a bore (not shown) in a center of the idler wheel 34 and through a bore (not shown) in each of the extensions 54, 58 of the respective crawler frame member 26, 30.

FIGS. 3-6 illustrate one of the front idler wheel assemblies 78 according to an embodiment of the invention. The front idler wheel assembly 78 includes the front idler wheel 34 locked to the idler axle shaft 74, which extends through a central bore (not shown) in the front idler wheel 34. In the illustrated embodiment, the front idler wheel 34 includes a hub portion, although in further embodiments the wheel 34 may be a single piece. In the illustrated embodiment, a diameter 84 of the idler axle shaft 74 is smaller than a diameter 86 of the central bore of the front idler wheel 34, which creates a small gap (not shown) therebetween during assembly. A taper lock bushing 90 is positioned within the gap. Due to extremely high radial loads applied through front idler wheel 34 during travel by the shovel 10 and as a result of the size of the components of the front idler wheel 34 and the idler axle shaft 74, a pair of taper lock bushings 90 (FIG. 4) are included in each front idler wheel assembly 78. One bushing 90 is installed from either side of the idler wheel 34. Access to the taper lock bushings 90 during assembly and disassembly is provided through the rectangular openings 62 of the first side 54 and the second side 58 of crawler frame members 26, 30. Additionally, each of the bushings 90 is covered by a contamination cap 88, which keeps debris (i.e., water, dust, dirt) from the bushings 90. The taper lock bushing 90 creates an interference fit, thereby locking the front idler wheel 34 to the idler axle shaft 74. The interference fit provides a rigid connection that constrains the front idler wheel 34 and the idler axle shaft 74 axially, radially, and torsionally. Thus, the interference fit restricts the motion of the wheel 34 preventing high wear in the front idler wheel assembly 78.

Figure 5:
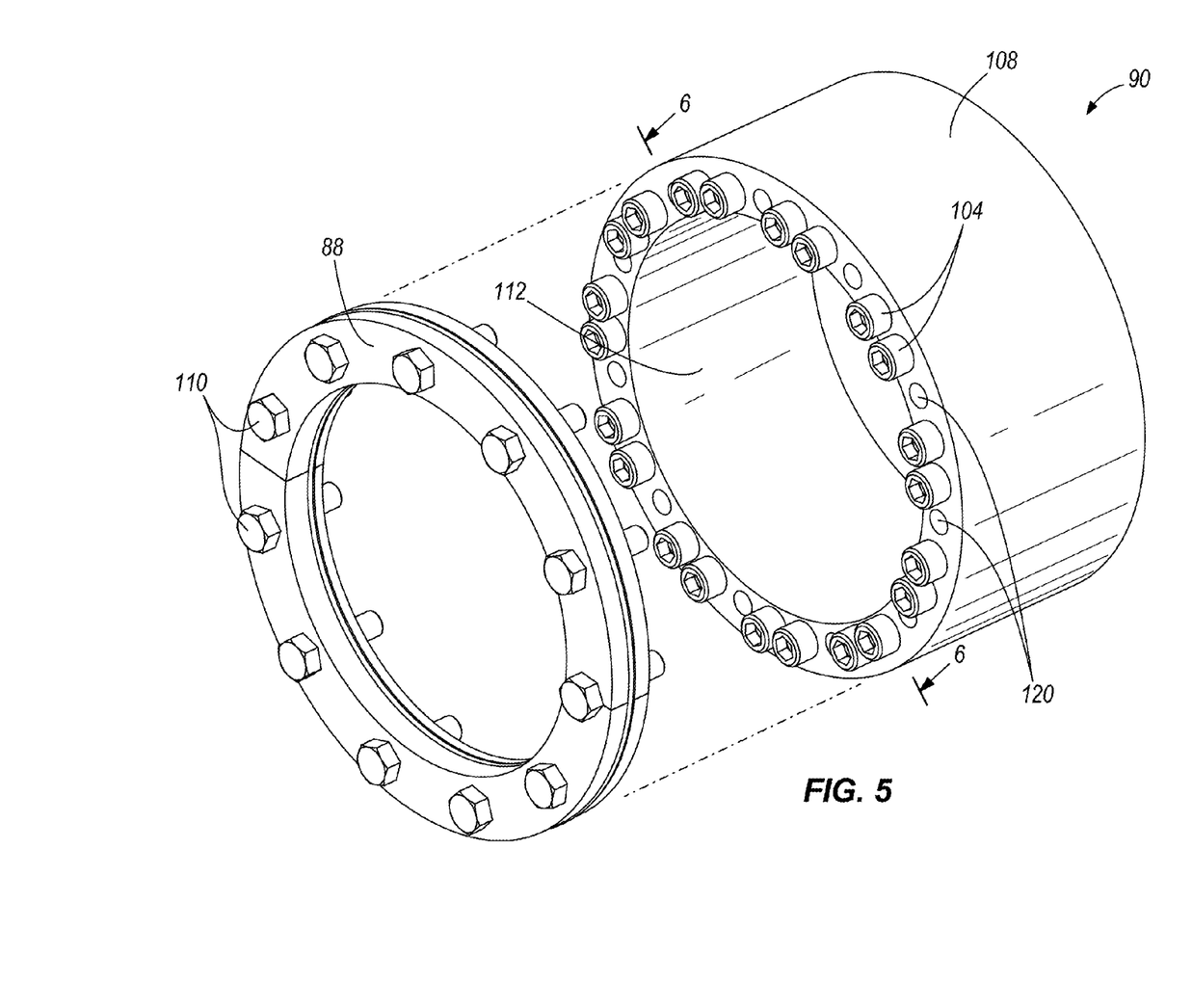
FIG. 5 illustrates a taper lock bushing shown in FIG. 4.
Figure 6:
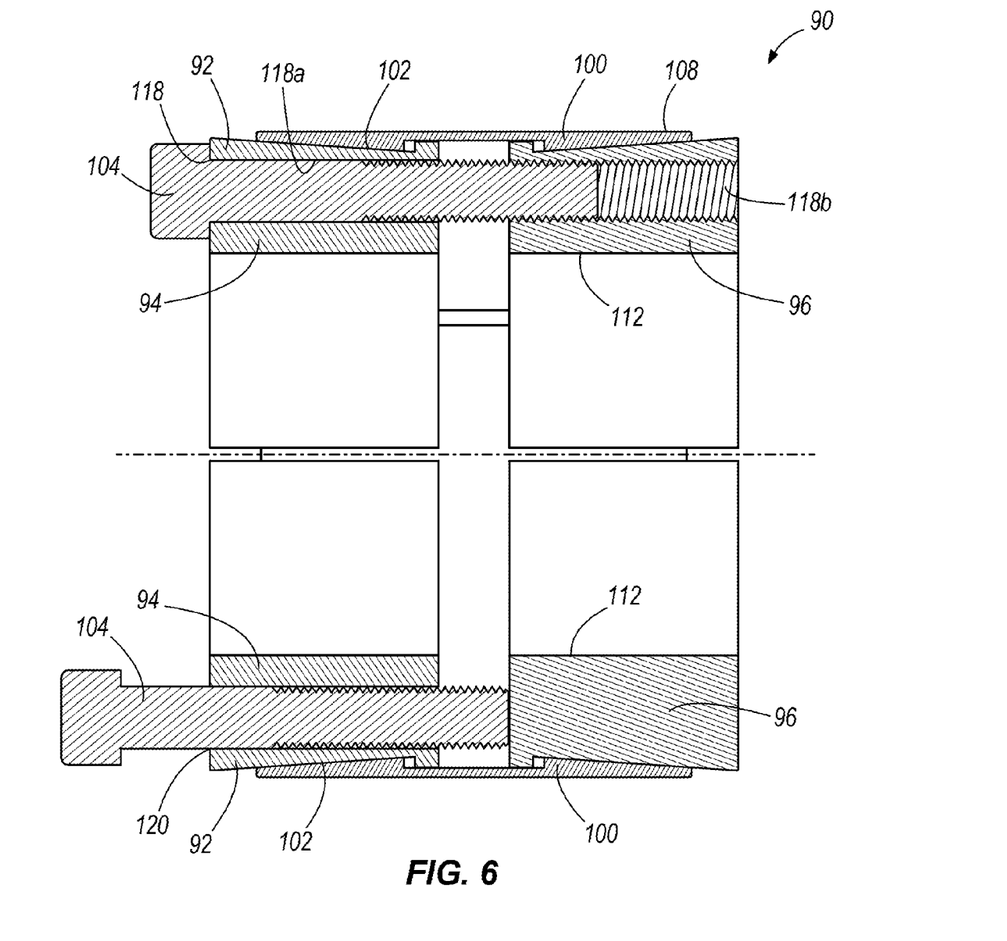
FIG. 6 illustrates a lock mechanism of the taper lock bushing shown in FIGS. 4-5, taken along 6-6 of FIG. 5.

As is shown in FIGS. 5 and 6, the taper lock bushing 90 includes a first inner member 94, a second inner member 96, and an outer member 100. The inner members 94, 96 have tapered outer surfaces 92 that are complimentary to and interface tapered inner surfaces 102 of the outer member 100 of the taper lock bushing 90. Additionally, the taper lock bushing 90 includes two types of axially extending holes: full-length holes 118 and half-length holes 120. The full-length holes 118 extend a length of the bushing 90. Holes 118 are defined by a through-hole portion 118a, which extends through the first inner member 94 of the bushing 90, and a threaded hole portion 118b, which extends through the second inner member 96 of the bushing 90. Holes 120 are threaded and extend through the first inner member 94 of the bushing 90; therefore, the holes 120 extend approximately half way through the bushing 90 and do not have a portion defined in the second inner member 96. In the illustrated embodiment, there are a pair of holes 118 for every one hole 120, with one hole 120 positioned between adjacent pairs of holes 118. The full-length holes 118 are assembly holes while the half-length holes 120 are disassembly holes.

During assembly of the front idler wheel assembly 78, fasteners 104 (e.g., screws) are used to create an interference fit between the front idler wheel 34 and the idler axle shaft 74. The interference fit is accomplished by tightening the fasteners 104. The fastener 104 is inserted into the through-hole portion 118a of the respective hole 118 and screwed into the threaded portion 118b of the hole 118. As the fastener is screwed into the threaded portion 118b, the two members 94, 96 of the bushing 90 are pulled closer together. As the two members 94, 96 are brought closer together, the tapered outer surfaces 92 slide in relation to the tapered outer surfaces 102 of the outer member 100, thereby pushing the outer member 100 radially outward and the inner members 94, 96 radially inward. As such, an outer diameter 108 of the bushing 90 radially expands, while an inner diameter 112 of the bushing 90 radially contracts. Expansion of the outer diameter 108 of the taper lock bushing 90 against the inner diameter 86 of the central bore of the front idler wheel 34 and simultaneous contraction of the inner diameter 112 of the taper lock bushing 90 against the idler axle shaft 74 creates the interference fit between the wheel 34 and the shaft 74. The expansion and contraction of the lock bushing 90 also produces significant surface pressure between the front idler wheel 34 and the idler axle shaft 74, thus locking them together and into position.

During disassembly of the front idler wheel assembly 78, the fasteners 104 may also be used to disassemble the taper lock bushing 90. After all of the fasteners 104 are removed from the assembly holes 118, some of the fasteners 104 are tightened into the other set of holes 120. As the fasteners 104 are tightened into the half-length holes 120, the fasteners 104 contact the second member 96. Because that portion of the member 96 does not have a hole, tightening of the fastener 104 pushes the second member 96 away from the first member 94 so that the tapered outer surfaces 92 of the inner members 94, 96 slide in relation to the tapered outer surfaces 102 of the outer member 100. This movement causes the outer member 100 to move radially inward and inner members 94, 96 to move radially outward. Therefore, the outer diameter 108 of the bushing 90 radially contracts while the inner diameter 112 of the bushing 90 radially expands. Thus, the bushings 90 are returned to their loose fit starting positions. While the front idler wheel components are assembled, the unlocking holes 120, which are threaded, are used to couple the contamination cap 88 to the taper lock bushing 90. Fasteners 110 occupy the holes 120, thereby coupling the contamination cap 88 to the bushings 90. The contamination cap 88 protects the bushings 90 from debris that fills the opened unlocking holes 120, cause the tapered surfaces 92 and 102 to rust tight, and inhibit loosening and removal of the bushings 90.

Figure 4:
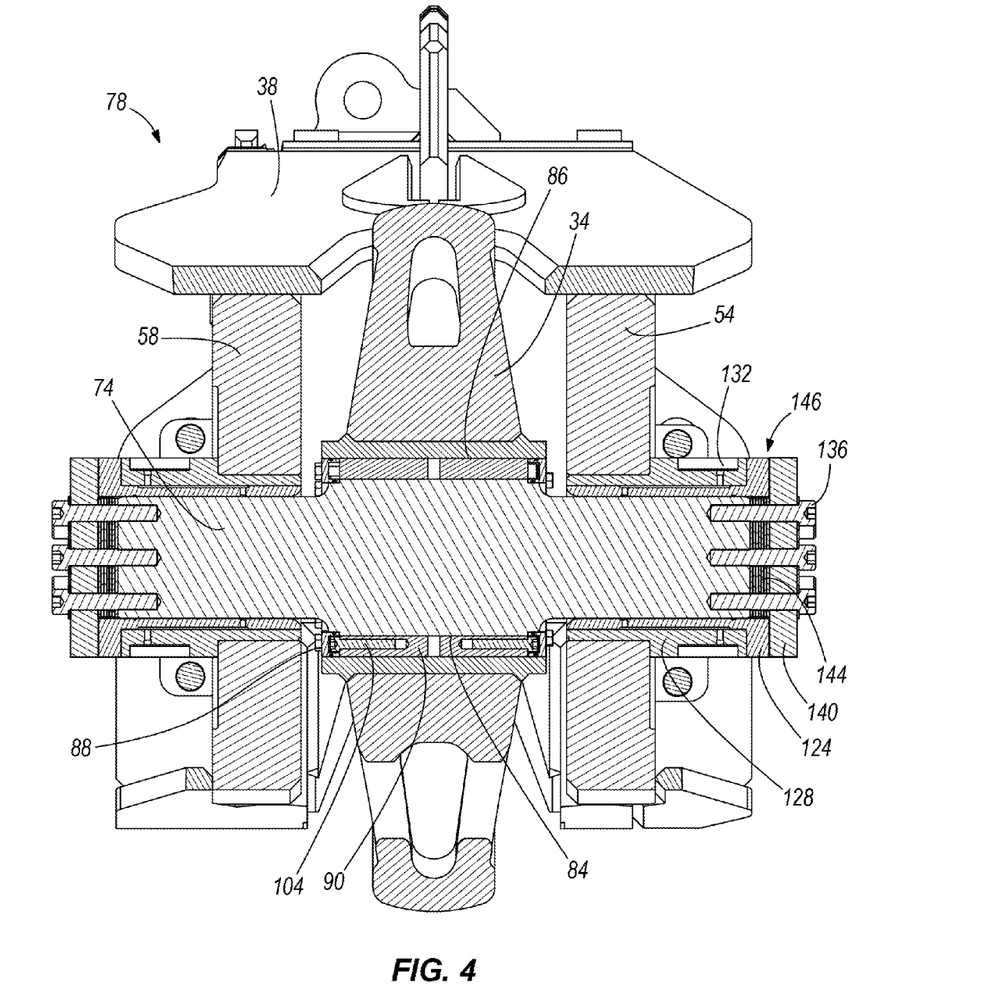
FIG. 4 is a cross-sectional view of the front idler wheel assembly of FIG. 3, taken along line 4-4.

The extensions 54, 58, of the crawler frame members 26, 30 lend lateral support to both sides of the front idler wheel 34 because the idler axle shaft 74 extends through the central bore (not shown) of the front idler wheel 34 and through a bore (not shown) in each of the two extensions 54, 58. Referring to FIG. 4, the axle shaft 74 is received by and rotates relative to two journal bushings 124 positioned on opposite sides of the idler wheel 34. Each of the bushings 124 is fixed to a bushing block 128 that is attached to the respective extension 54, 58 of the crawler frame members 26, 30. Each of the bushing blocks 128 includes a recess 132 for lubrication lines to lubricate the journal bushings 124. Fasteners 136, or connectors, couple axle end caps 140 to the idler axle shaft 74 for rotation therewith, and the fasteners 136 extend through shims 144. A thrust surface 146 is located at an interface between the journal bushings 124 and the axle end cap 140. In the illustrated embodiment, the axle end caps 140 wear against the journal bushings 124 as a result of side thrust forces that are introduced to the front idler wheel 34 as the shovel 10 moves and pivots. As increased wear occurs on the journal bushings 124, the axle end caps 140 are removed to replace the journal bushings 124 without disassembling the entire front idler wheel assembly 78. Furthermore, the shims 144 in between the idler axle shaft 74 and the axle end caps 140 may be removed to reduce the gap between the journal bushings 124 and axial end caps 140, as the journal bushings 124 wear away.

Figure 7:
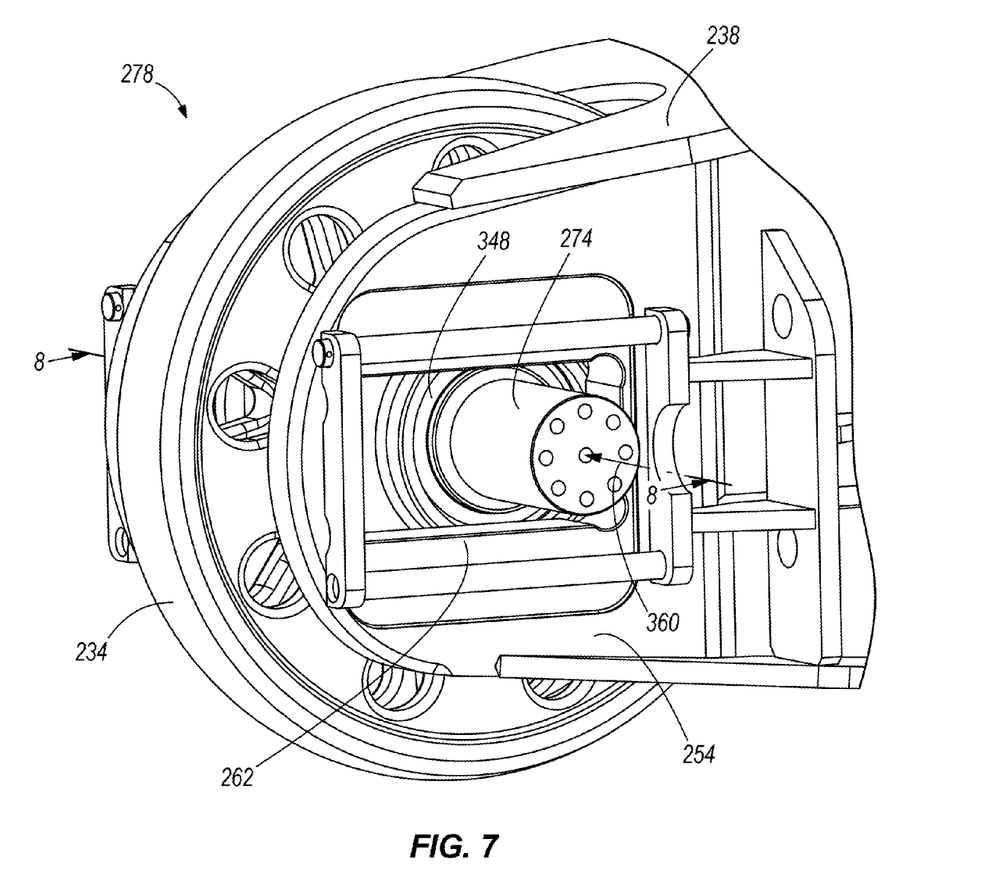
FIG. 7 is a perspective view of a front idler wheel assembly according to another embodiment of the invention.
Figure 8:
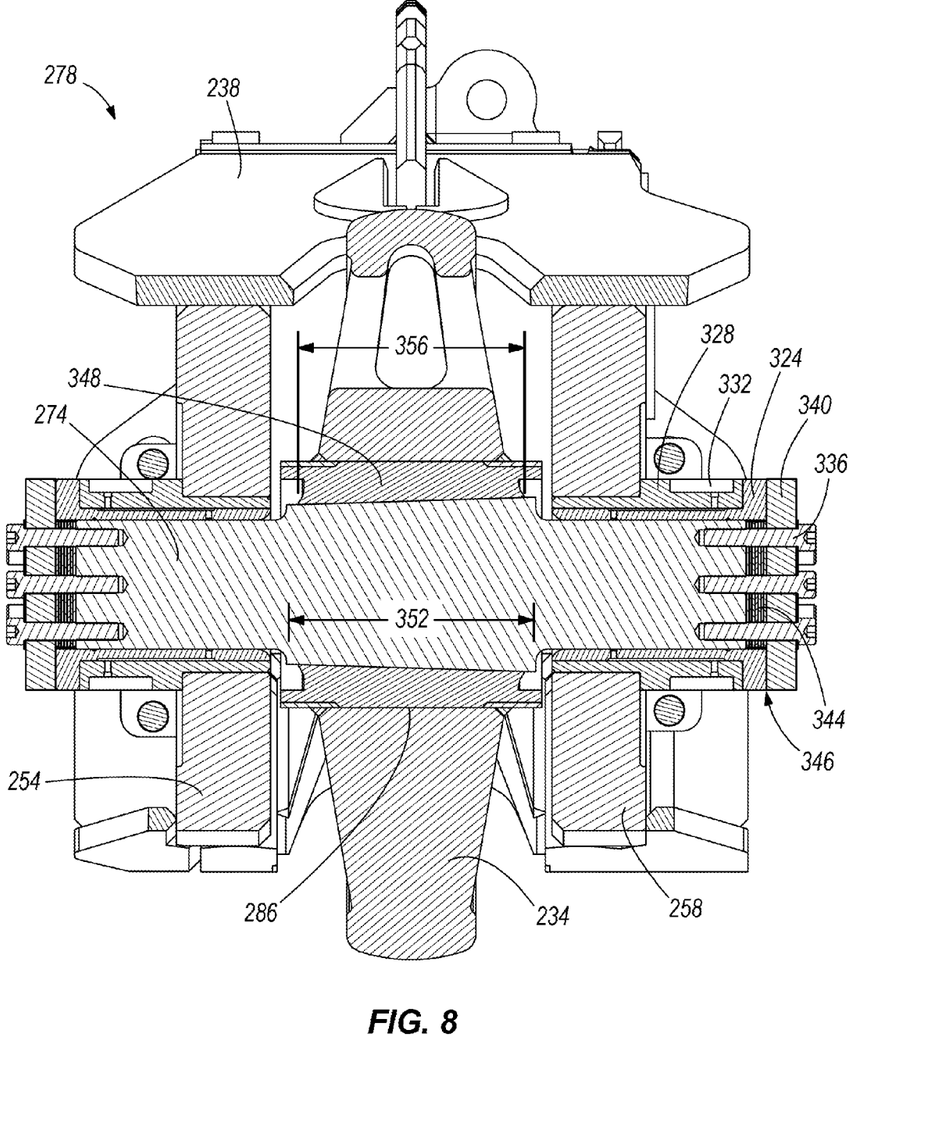
FIG. 8 is a cross-sectional view of the front idler wheel assembly of FIG. 7 taken along line 8-8.

FIGS. 7 and 8 illustrate a front idler wheel assembly 278 according to another embodiment of the invention. The front idler wheel assembly 278 of FIGS. 7 and 8 is similar to the front idler wheel assembly 78 of FIGS. 3-6; therefore, like structure will be identified by like reference numbers plus "200" and only the differences will be discussed hereafter.

The front idler wheel assembly 278 includes an idler axle shaft 274, which extends through a central bore (not shown) of a wheel hub 348 coupled to a front idler wheel 234. The wheel hub 348, which is coupled (e.g., by welding) to an inner diameter 286 of the wheel 234, fills a gap (not shown) between the front idler wheel 234 and the idler axle shaft 274. Referring to FIG. 8, both the axle shaft 274 and the wheel hub 348 include a tapered portion, 352 and 356 respectively, of the diameter, which are complementary to each other. An angle of taper of the tapered portions 352 and 356 of both the idler axle shaft 274 and the wheel hub 348 is approximately 3.6°. However, in further embodiments, the angle of taper could be greater or less than 3.6°.

During assembly, a substantial force is applied using an external device in the direction of arrow 360 to drive mating components, the front idler wheel 234 and the idler axle shaft 274, axially together; thereby creating significant surface pressure. The surface pressure keeps the front idler wheel 234 and the idler axle shaft 274 fixed together after the force is removed and during operation of a mining shovel 10. The tapered surfaces of the axle shaft 274 and the idler wheel hub 348 provide the interference fit therebetween, thereby providing a rigid connection to constrain the front idler wheel 234 and the idler axle shaft 274 axially, radially, and torsionally. The interference fit is accomplished by manufacturing both the axle shaft 274 and idler wheel 234 with a small degree of taper on the mating diameters. Thus, the interference fit restricts the relative motion of the wheel 234 and the idler axle shaft 274 preventing high wear in the front idler wheel assembly 278

In a further embodiment, the front idler wheel assembly does not include a wheel hub and the inner diameter of the idler wheel is manufactured with a tapered surface. An interference fit is created between the front idler wheel and the tapered axle shaft by mating the tapered surfaces of the two components.

Although the invention has been described in detail with reference to certain preferred embodiments, variations and modifications exist within the scope and spirit of one or more independent aspects of the invention as described.

Thus, the invention provides, among other things, a rigid connection between components of an idler wheel assembly thereby preventing sliding wear on joint surfaces by restricting movement of the idler wheel and rotating axle shaft radially, axially, and torsionally. Various features and advantages of the invention are set forth in the following claims.

What is claimed is:

1. A crawler assembly including a crawler frame member having a first crawler extension and a second crawler extension, the crawler assembly comprising:
    an idler wheel disposed between the first and second crawler extensions, the wheel defining a bore therethrough;
    a shaft extending through the bore, the shaft being fixed relative to the wheel by a tapered interference fit and rotatable relative to the first and second crawler extensions;
    a first side of the shaft received by the first extension and having at least one journal bushing disposed therebetween;
    a second side of the shaft received by the second extension and having a least one journal bushing disposed therebetween; and
    a removable endcap secured to each of the first and the second sides of the shaft;
    wherein a thrust surface is created at an interface between the endcaps and the journal bushings.

2. The crawler assembly of claim 1, wherein the tapered interference fit is created by a taper lock bushing disposed between the shaft and the wheel, the bushing configured for receiving a fastener.

3. The crawler assembly of claim 2, wherein the taper lock bushing includes:
    a first inner member and a second inner member, each of which is disposed about the shaft and includes a tapered outer surface;
    an outer member disposed about at least a portion of the outer surfaces of the first and second inner members, the outer member including a pair of tapered inner surfaces, each of which is complimentary to one of the tapered outer surfaces of the first and second inner members;
    an assembly hole including a through-hole portion extending through the first inner member and a threaded portion extending through the second inner member; and
    a disassembly hole including a threaded portion extending through the second inner member.

4. The crawler assembly of claim 3, wherein the fastener is inserted into the assembly hole in order to achieve the tapered interference fit, whereby the first and second inner members are pulled together along the shaft as the fastener is threaded into the threaded portion of the assembly hole thereby expanding the bushing as the tapered surfaces of the first and second inner members slide relative to the tapered surface of the outer member.

5. The crawler assembly of claim 3, wherein the fastener is inserted in the disassembly hole to release the tapered interference fit, whereby when the fastener is threaded into the threaded portion of the disassembly hole the fastener contacts the second inner member in order to push the second inner member away from the first inner member thereby contracting the bushing as the tapered surfaces of the first and second members slide relative to the tapered surfaces of the outer member.

6. The crawler assembly of claim 3, wherein the taper lock bushing includes a plurality of assembly holes and a plurality of disassembly holes.

7. The crawler assembly of claim 1 further comprising a wheel hub coupled to the wheel, the wheel hub having a tapered inner diameter.

8. The crawler assembly of claim 7, wherein a portion of the shaft includes a tapered outer diameter that is complimentary to the tapered inner diameter, whereby the interference fit is created therebetween to fix the shaft relative to the wheel.

9. The crawler assembly of claim 8, wherein each of the tapered inner diameter of the wheel hub and the tapered outer diameter of the shaft has an angle of taper of approximately 3.6°.

10. The crawler assembly of claim 1, wherein the shaft is constrained axially, radially, and torsionally relative to the wheel.

11. The crawler assembly of claim 1, wherein the journal bushings are removable and replaceable.

12. The crawler assembly of claim 1, wherein removable shims are disposed between each endcap and the respective side of the shaft.

13. An idler wheel assembly comprising:
    an idler wheel for attachment between a first extension and a second extension of a crawler frame, the wheel including a bore;
    a wheel hub coupled to the wheel, the wheel hub having a tapered inner diameter;
    a shaft extending through the bore of the wheel and the hub;
    a first side of the shaft received by the first extension and having at least one journal bushing disposed therebetween;
    a second side of the shaft received by the second extension and having a least one journal bushing disposed therebetween;
    a removable endcap secured to each of the first and the second sides of the shaft;

wherein a portion of the shaft includes a tapered outer diameter that is complimentary to the tapered inner diameter, whereby an interference fit is created therebetween to fix the shaft relative to the wheel;

wherein a thrust surface is created at an interface between the endcaps and the journal bushings.

14. The idler wheel assembly of claim 13, wherein the interference fit constrains the shaft axially, radially, and torsionally relative to the wheel.

15. The idler wheel assembly of claim 13, wherein each of the tapered inner diameter of the wheel hub and the tapered outer diameter of the shaft has an angle of taper of approximately 3.6°.

16. The idler wheel assembly of claim 13, wherein a force drives the tapered inner diameter of the wheel hub and the tapered outer diameter of the shaft together.

17. The idler wheel assembly of claim 13, wherein the journal bushings are removable and replaceable.

18. The idler wheel assembly of claim 13, wherein removable shims are disposed between each endcap and the respective side of the shaft.

* * * * *